US011978949B2

(12) United States Patent
Miau

(10) Patent No.: US 11,978,949 B2
(45) Date of Patent: May 7, 2024

(54) CAVITIES HAVING ANTENNAS

(71) Applicant: HEWLETT-PACKARD DEVELOPMENT COMPANY, L.P., Spring, TX (US)

(72) Inventor: Ruei-Ting Miau, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 65 days.

(21) Appl. No.: 17/550,962

(22) Filed: Dec. 14, 2021

(65) Prior Publication Data

US 2023/0187815 A1 Jun. 15, 2023

(51) Int. Cl.

| | |
|---|---|
| *H01Q 15/02* | (2006.01) |
| *H01Q 1/22* | (2006.01) |
| *H01Q 1/24* | (2006.01) |

(52) U.S. Cl.

CPC ........... *H01Q 1/241* (2013.01); *H01Q 1/2283* (2013.01); *H01Q 15/02* (2013.01)

(58) Field of Classification Search

CPC ...... H01Q 1/241; H01Q 1/243; H01Q 1/2216; H01Q 1/2283; H01Q 13/10; H01Q 13/18; H01Q 15/02; H01Q 19/06; H01Q 1/24; H01Q 1/22; G06K 7/089; G06K 7/10732; G06K 7/10742; G06K 7/10821; G06K 7/10831

See application file for complete search history.

(56) References Cited

U.S. PATENT DOCUMENTS

| | | | | |
|---|---|---|---|---|
| 5,706,017 | A | 1/1998 | Büttgenbach | |
| 6,543,693 | B1 * | 4/2003 | Stern | G06K 7/10643 235/462.35 |
| 8,174,452 | B2 * | 5/2012 | Ayala Vazquez | H01Q 1/36 343/702 |
| 8,780,012 | B2 | 7/2014 | Llombart Juan et al. | |
| 9,475,149 | B1 * | 10/2016 | Testrake | B29D 11/00317 |
| 2010/0019882 | A1 * | 1/2010 | Stern | G06K 7/0008 340/10.1 |
| 2010/0328779 | A1 * | 12/2010 | Llombart Juan | H01Q 19/09 359/619 |
| 2011/0121075 | A1 * | 5/2011 | Bellows | G06K 7/0004 235/440 |
| 2013/0221098 | A1 * | 8/2013 | Wang | H01Q 1/2216 235/440 |
| 2016/0087344 | A1 * | 3/2016 | Artemenko | H01Q 21/29 343/753 |
| 2017/0346190 | A1 * | 11/2017 | Kim | H01P 3/12 |
| 2022/0271206 | A1 * | 8/2022 | Lopez | F21V 9/40 |

* cited by examiner

*Primary Examiner* — Thai Pham

(74) *Attorney, Agent, or Firm* — Knobbe, Martens, Olson & Bear, LLP

(57) ABSTRACT

In some examples in accordance with the present description, an electronic device includes a cavity having an antenna. The cavity includes a light source and a lens to direct a light generated by the light source through an opening. The opening has a dimension that is proportional to an operating frequency of the antenna.

7 Claims, 6 Drawing Sheets

CAVITIES HAVING ANTENNAS

BACKGROUND

Electronic devices such as notebooks, laptops, desktops, tablets, and smartphones include antennas to enable wireless communication. A number of antennas utilized to enable wireless communications varies responsive to differences in wireless communication technology.

BRIEF DESCRIPTION OF THE DRAWINGS

Various examples are described below referring to the following figures.

DETAILED DESCRIPTION

Figure 1A:
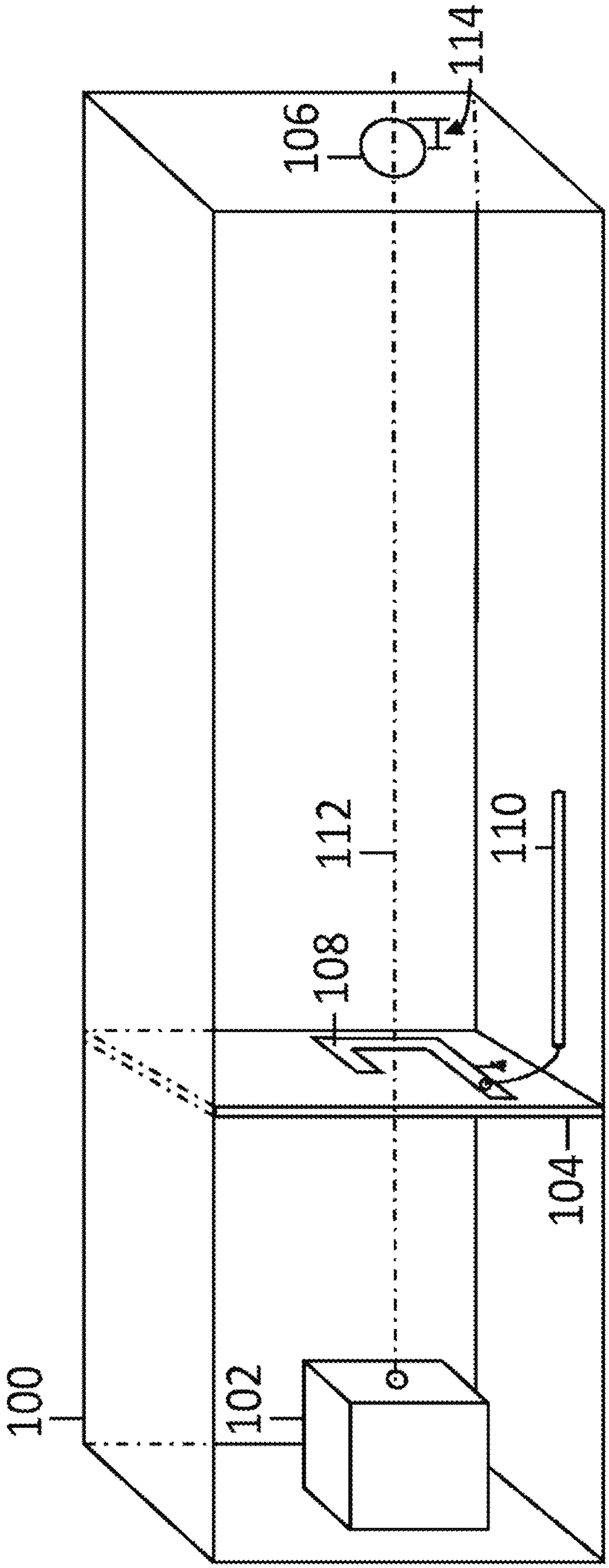
FIG. 1A is a block diagram depicting a cavity having an antenna, in accordance with various examples.

As described above, electronic devices include antennas to enable wireless communication. To enhance reception of an antenna, the antenna is located in a frame of an electronic device. The frame, as used herein, is a portion of a chassis of the electronic device that borders a display device of the electronic device. Other components of the electronic device such as input/output (I/O) ports, image sensors, light sensors, time of flight sensors, barcode scanners, a control board, or a combination thereof, are also located in the frame. In some instances, the other components interfere with the reception of the antenna.

As technology for the electronic device advances, a consumer preference for high display screen to body ratio (STBR) increases. As the STBR increases, availability of locations to place the antenna decreases because a size of the frame decreases. The decreased frame size results in the antenna having a closer proximity to the other components of the electronic device. The closer proximity results in increased interference from the other components. To compensate for the increased interference, the electronic device includes shielding that increases a cost of the electronic device.

This description describes electronic devices that utilize existing cavities to house antennas. The existing cavities are for image sensors, light sensors, time of flight sensors, barcode scanners, or any other suitable peripheral device that includes a light source, a lens to guide a light generated by the light source, an opening through which the light travels, or a combination thereof. In some examples, an antenna is located on the lens. The antenna is located so as not to interfere with a path of light traveling through the lens and within or through the cavity. The antenna is formed as metal traces on the lens. The total length of the metal traces is a proportional relationship between a wavelength and a frequency over which the antenna operates. The total length of the metal traces is a quarter wavelength of an operating frequency of the antenna, for example. The lens is planar so as not to generate electromagnetic (EM) wave convergence or divergence. A dimension of the opening is a multiple of the operating frequency of the antenna, for example.

In other examples, the antenna is placed behind a sensor so as not to interfere with the light generated by the light source. The antenna is located on a first side of a printed circuit board (PCB) that faces the opening, for example. The lens is convex to transform the EM wave from having a spherical wave front to a planar wave front. The convex lens is located within the cavity such that the path of light traveling within or through the cavity travels through a center of the convex lens. The convex lens has a focal length. The focal length, as used herein, is a distance at which a wave traveling through the center of the convex lens converges at a focal point. A first distance that is twice the focal length separates the light source from the convex lens. A second distance that is equivalent to the focal length separates the convex lens from the opening. A dimension of the opening is proportional to the operating frequency of the antenna, for example. In various examples, a guide structure is located within the cavity to guide the EM wave through the opening. In some examples, a conductive coating covers interior walls of the cavity, a guide structure, or a combination thereof.

Locating the antenna within the existing cavity allows for an increased STBR because the size of the frame remains static while accommodating the antenna. Additionally, locating the antenna within the existing cavity that includes the image sensor, the light sensor, the time of flight sensor, the barcode scanner, or other suitable peripheral device that includes a light source, a lens, an opening, or a combination thereof, enhances the performance of the antenna by reducing interference from other components. The reduced interference from the other components also reduces an amount of shielding utilized within the electronic device.

In some examples in accordance with the present description, an electronic device is provided. The electronic device includes a cavity having an antenna. The cavity includes a light source and a lens to direct a light generated by the light source through an opening. The opening has a dimension that is proportional to an operating frequency of the antenna.

In other examples in accordance with the present description, an electronic device is provided. The electronic device includes a cavity having an opening. The cavity includes a light source and a lens having an antenna on a surface of the lens. The lens directs a light generated by the light source through the opening.

In yet other examples in accordance with the present description, an electronic device is provided. The electronic device includes a cavity having an opening. The cavity includes a light source, a PCB having an antenna, and a lens to converge EM waves of the antenna at the focal point. The PCB is located behind the light source. The focal point is located in proximity to the opening.

Figure 1B:
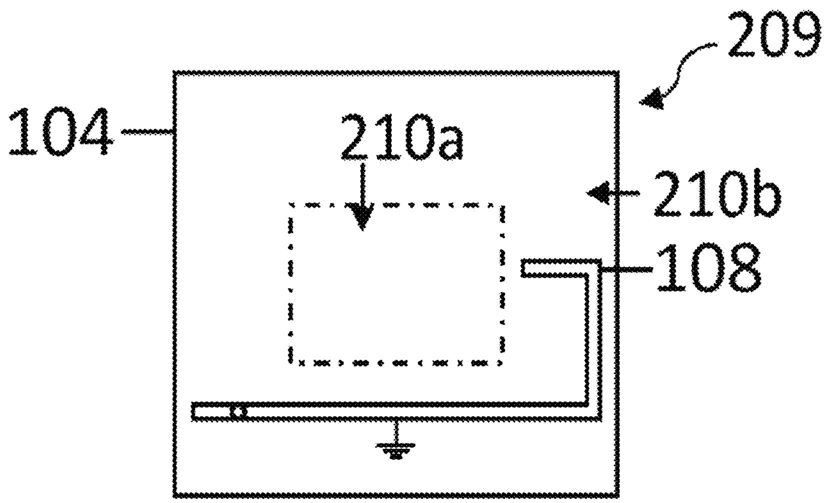
FIG. 1B is a block diagram depicting a lens having an antenna, in accordance with various examples.

Referring now to FIGS. 1A and 1B, a block diagram showing a cavity 100 having an antenna 108 is provided, in accordance with various examples. The cavity 100 includes a laser aiming device, an image sensor, a light emitting diode (LED), or a combination thereof, for example. The cavity 100 includes a light source 102, a lens 104, an opening 106, the antenna 108, and a coaxial cable 110. The light source 102 is any suitable electronic component that generates a light that travels within or through the cavity 100 along the path 112. The light source 102 is a laser aiming device or an LED, for example. The lens 104 is any suitable transparent material that is planar so as not to generate convergence or divergence of an EM wave traveling within or through the cavity 100. The opening 106 is of any suitable shape having a dimension 114 that has a proportional relationship to a wavelength of an operating frequency of the antenna 108. The opening 106 is rectangular, elliptical, or circular, for example. The dimension 114 is a length or a radius, for example. The antenna 108 is of any suitable resonating material. The coaxial cable 110 is to transmit EM waves to and from the antenna 108.

In various examples, the lens 104 couples to the antenna 108 and to a ground. The antenna 108 couples to the lens 104, the ground, and the coaxial cable 110. The coaxial cable 110 couples to the antenna 108 and to other components of an electronic device (not explicitly shown). The light source 102 couples to other components of the electronic device (not explicitly shown). For examples of the electronic device including the cavity 100, refer to the description below for FIG. 5.

A material of a housing of the cavity 100 is a metal, a polymer, or a combination thereof. For example, the material of the housing of the cavity 100 is an aluminum alloy or a magnesium alloy. In another example, the material of the housing of the cavity 100 is a carbon fiber or a plastic. In various examples, the cavity 100 is integrated into a chassis of the electronic device. In other examples, the cavity 100 is mounted to an exterior surface of the chassis of the electronic device.

In some examples, the cavity 100 is prism-shaped with a longitudinal axis having length, L. In various examples, L is larger than a width, W, of the cavity 100. During operations of the antenna 108, EM waves travel within and through the cavity 100 via the opening 106. While the cavity 100 is shown having a prism shape, in other examples, the cavity 100 has other shapes such as other polyhedrals, cylinders, cones, or any suitable shape that includes the light source 102, the lens 104, the opening 106, the antenna 108, and the coaxial cable 110.

In some examples, the antenna 108 is formed by metal traces. The metal traces are printed foil structures, wires, or a combination thereof. The metal traces are traces of copper, gold, or other suitable metals. In various examples, the antenna 108 has a total length, X, in millimeters (mm) and a width, Y, in mm that generate an area in millimeters squared (mm2). For example, X is 80 mm and Y is 7 mm for an operating frequency of a Wireless Wide Area Network (WWAN). In other examples, the length, the width, or the combination thereof, are selected to enable communications over any suitable frequency band. For example, the length of the antenna 108 is a multiple of the wavelength of the operating frequency of the antenna 108. The length is a quarter of the wavelength of the operating frequency, for example. The frequency bands include a 2.4 gigahertz (GHz) band, a 5 GHz band, a 1575 megahertz (MHz) band, or any other frequency band that enables wireless communications. In various examples, a standard or specification describes the frequency bands that enable wireless communications. The standard or specification is for a third generation (3G) wireless communication network, a fourth generation (4G) communication network, or a fifth generation (5G) communication network, for example. The antenna 108 may be a single-band or a multiband antenna.

In various examples, an electronic device includes the cavity 100 having the opening 106. The electronic device is a notebook, a laptop, a desktop, a tablet, or a smartphone, for example. The cavity 100 includes the light source 102 and the lens 104 having the antenna 108 on a surface of the lens 104. The lens 104 is to direct a light generated by the light source 102 through the opening 106. The dimension 114 of the opening 106 is proportional to the operating frequency of the antenna 108, in some examples. In various examples, a surface of the lens 104 has a first portion and a second portion. The first portion of the lens 104 directs the light generated by the light source 102 through the opening 106. The second portion of the lens 104 is contiguous to the first portion. A metal trace of the antenna 108 is mounted to the second portion of the lens 104.

Figure 2A:
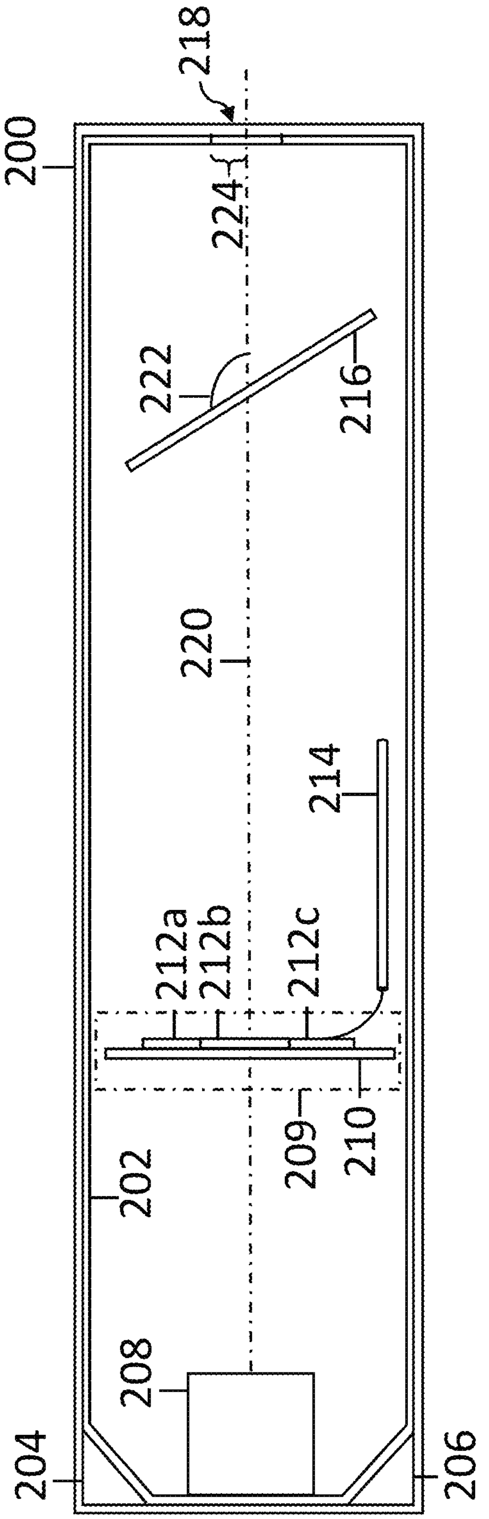
FIG. 2A is a block diagram depicting a cavity having an antenna, in accordance with various examples.

Referring now to FIG. 2A, a block diagram showing a cavity 200 having an antenna 212 is provided, in accordance with various examples. Antenna sections 212*a*, 212*b*, 212*c* are herein referred to collectively as the antenna 212. The cavity 200 is the cavity 100, for example. The antenna 212 is the antenna 108, for example. The cavity 200 includes a coating 202, guide structures 204, 206, a light source 208, a lens 210, the antenna 212, a coaxial cable 214, a lens 216, and an opening 218. The coating 202 is any suitable transparent conducting material. For example, the coating 202 is a transparent conducting oxide. The guide structures 204, 206 are of any suitable shape to guide the EM wave generated by the antenna 212 through the opening 218. The guide structures 204, 206 are located within the cavity 200 in locations that do not block light traveling on a path 220. The light source 208 is the light source 102, for example. The light source 208 generates the light that travels within or through the cavity 200 toward the opening 218 via the path 220. The lens 210 is the lens 104, for example. The coaxial cable 214 is the coaxial cable 110, for example. The lens 216 is any suitable transparent material that is planar so as not to generate convergence or divergence of an EM wave traveling within or through the cavity 200. The opening 218 is the opening 106, for example. The opening 218 has a dimension 224. The lens 216 has an angle 222 relative to the path 220. The lens 216 is located within the cavity 200 so that the angle 222 increases an area illuminated by the light generated by the light source 208.

In various examples, as shown by an area 209, the lens 210 couples to the antenna 212. The antenna 212 couples to the lens 210 and the coaxial cable 214. The coaxial cable 214 couples to the antenna 212 and to other components of an electronic device (not explicitly shown). The light source 208 couples to other components of the electronic device (not explicitly shown). For examples of the electronic device including the cavity 200, refer to the description below for FIG. 5.

As described above with respect to FIGS. 1A and 1B, in some examples, the cavity 200 has a shape other than a prism. For example, the guide structures 204, 206 modify the shape of the cavity 200 from prism-shaped. While the guide structures 204, 206 are shown having a same shape and located in positions that mirror each other, in other examples, the guide structure 204 is a first shape and the guide structure 206 is a second shape. The first shape causes an EM wave to travel in a first direction within the cavity 200, and the second shape causes the EM wave to travel in a second direction within the cavity 200. The second direction is different than the first direction. In various examples, the guide structure 204 is located in a first location that causes an EM wave to travel in a first direction within the cavity 200, and the guide structure 206 is located in a second location that causes the EM wave to travel in a second direction within the cavity 200. In some examples, the first location and the second location are in non-mirrored positions relative to each other. The second direction is different from the first direction. Utilizing the guide structures 204,

206 enhances reception and generation of EM waves by the antenna 212. Utilizing the coating 202 enhances reception and generation of EM waves by the antenna 212.

Figure 2B:
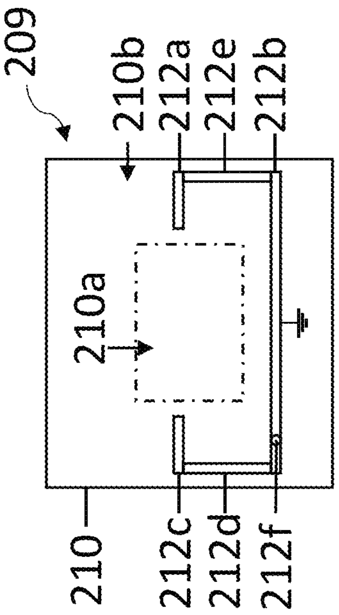
FIG. 2B is a block diagram depicting a lens having an antenna, in accordance with various examples.

Referring now to FIG. 2B, a block diagram of the lens 210 having the antenna 212 is provided, in accordance with various examples. The block diagram is a different perspective of the area 209 shown above with respect to FIG. 2A. The lens 210 has a first portion 210*a* and a second portion 210*b*. The first portion 210*a* is a portion of the lens 210 that directs the light generated by a light source (e.g., the light source 208). The second portion 210*b* is contiguous to the first portion 210*a*. Antenna sections 212*a*, 212*b*, 212*c*, 212*d*, 212*e*, 212*f* are herein referred to collectively as the antenna 212.

In various examples, the second portion 210*b* of the lens 210 couples to the antenna 212 and to ground. The antenna sections 212*a*, 212*b*, 212*c*, 212*d*, 212*e*, 212*f* couple to the second portion of the lens 210. An antenna section 212*b* couples to ground. An antenna section 212*f* couples to a coaxial cable (e.g., the coaxial cable 214). Mounting the antenna 212 to the second portion 210*b* blocks the opaque metal traces of the antenna 212 from interfering with a path (e.g., the path 220) of the light traveling from the light source through the opening (e.g., the opening 218).

Figure 3:
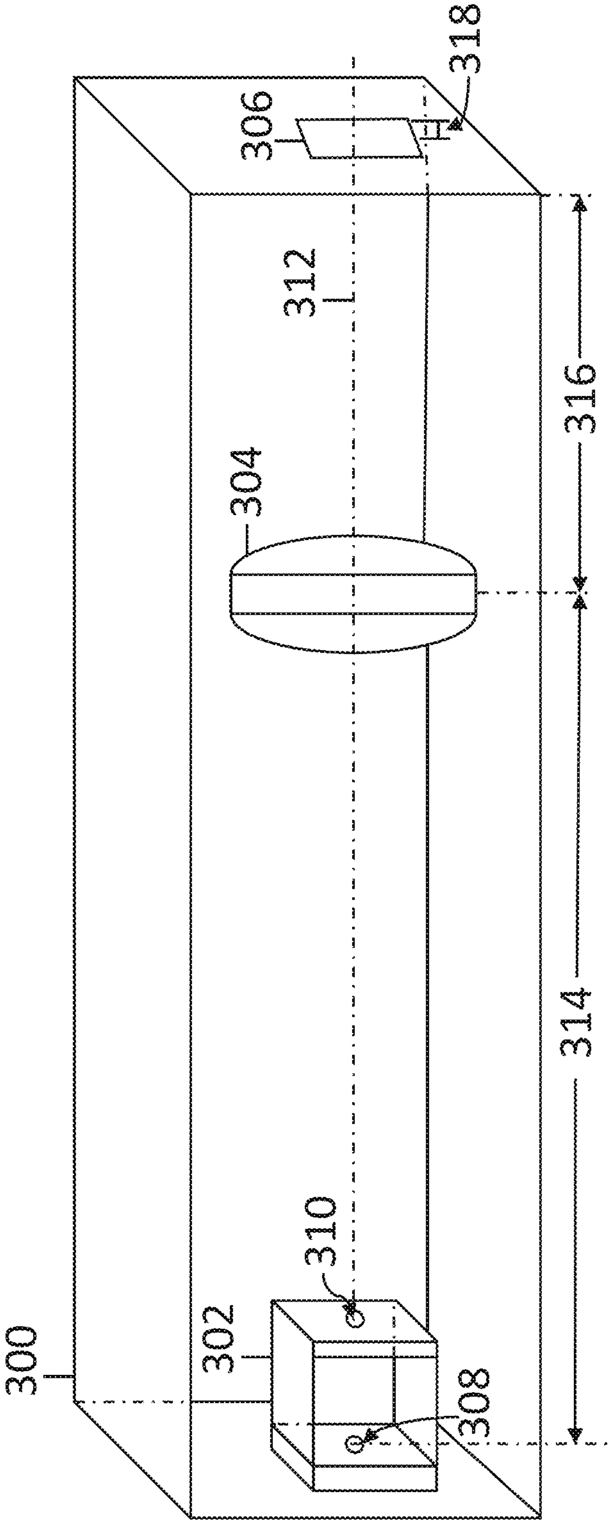
FIG. 3 is a block diagram depicting a cavity having an antenna, in accordance with various examples.

Referring now to FIG. 3, a block diagram showing a cavity 300 having an antenna 308 is provided, in accordance with various examples. The cavity 300 is the cavity 100, 200, for example. The cavity 300 includes a structure 302, a lens 304, and an opening 306. The structure 302 houses the antenna 308 and a light source 310. The antenna 308 is of any suitable resonating material. The light source 310 is the light source 102, 208, for example. The lens 304 is any suitable transparent, dielectric material that is shaped so as to converge an EM wave of the antenna 308 at a focal point. The lens 304 is a convex lens, for example. The opening 306 is of any suitable shape having a dimension 318 that has a proportional relationship to a wavelength of an operating frequency of the antenna 308. The opening 306 is rectangular, elliptical, or circular, for example. The dimension 318 is a length or a radius, for example.

In various examples, the antenna 308 couples to a first side of the structure 302 and the light source 310 couples to a second side of the structure 302, where the second side is opposite the first side. The antenna 308 couples to a ground and a coaxial cable (not explicitly shown). The coaxial cable couples to the antenna 308 and to other components of an electronic device (not explicitly shown). The light source 310 couples to other components of the electronic device (not explicitly shown). For examples of the electronic device including the cavity 300, refer to the description below for FIG. 5.

In some examples, the lens 304 is convex to transform the EM wave from having a spherical wave front to a planar wave front. The lens 304 is located within the cavity 300 such that the path 312 of the light traveling within or through the cavity 300 travels through a central point of the lens 304, as described below with respect to FIG. 4. In some examples, a distance 314 between a central axis of the lens 304 and the antenna 308 is equivalent to or exceeds twice the focal length. A distance 316 between the central axis of the lens 304 and the opening 306 is equivalent to or exceeds the focal length.

In some examples, the electronic device includes the cavity 300 having the opening 306. The cavity 300 includes the light source 310, a PCB having the antenna 308, and the lens 304. The lens 304 converges EM waves of the antenna 308 at the focal point. The PCB is located behind the light source 310. The focal point is located in proximity to the opening 306. In various examples, a first side of the PCB is a decoder of an image sensor, and a second side of the PCB is the antenna 308. The second side is opposite to the first side. In other examples, the antenna 308 is located on a side of a PCB that faces the opening 306.

Locating the antenna 308 on the second side of the structure 302 that is behind the light source 310 relative to the opening 306 blocks the antenna 308 from interfering with the light generated by the light source 310. Locating the lens 304 such that the distance 316 is equivalent to the focal length propagates the EM wave through the opening 306.

Figure 4:
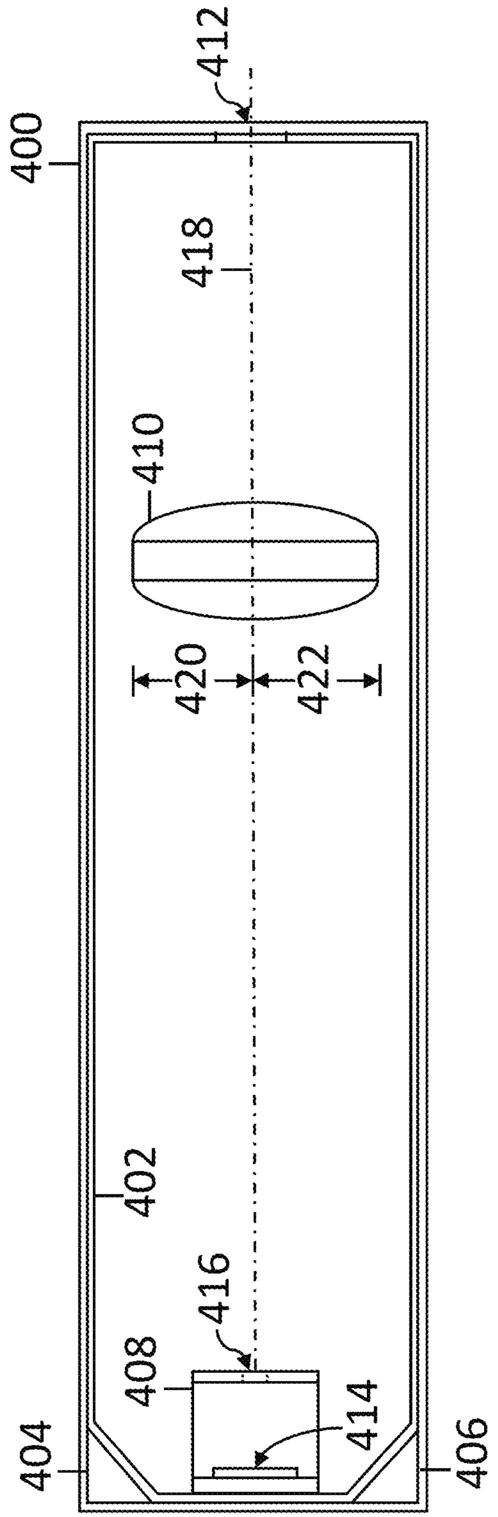
FIG. 4 is a block diagram depicting a cavity having an antenna, in accordance with various examples.

Referring now to FIG. 4, a block diagram showing a cavity 400 having an antenna 414 is provided, in accordance with various examples. The cavity 400 is the cavity 300, for example. The antenna 414 is the antenna 308, for example. The cavity 400 includes a coating 402, guide structures 404, 406, a structure 408, a lens 410, and an opening 412. The coating 402 is the coating 202, for example. The guide structures 404, 406 are the guide structures 204, 206, for example. The structure 408 includes the antenna 414 and a light source 416. The light source 416 is the light source 310, for example. The light source 416 generates a light that travels within and through the cavity 400 via a path 418. The lens 410 is the lens 304, for example. The lens 410 has a height that is equivalent to a sum of distances 420, 422. The opening 412 is the opening 306, for example.

In various examples, responsive to the distance 420 being equivalent to the distance 422, the path 418 travels through a central point of the convex shape of the lens 410. Locating the lens 410 so that the path 418 travels through the central point of the convex shape blocks the lens 410 from generating a reflection or a convergence of the light traveling the path 418.

In various examples, an interior surface of the cavity 400 is coated in a transparent conductive oxide. In some examples, the cavity 400 includes the guide structures 404, 406 located outside the path 418 of the light generated by the light source 416. The guide structures 404, 406 are to direct an EM wave of the antenna 414 through the opening 412.

Figure 5:
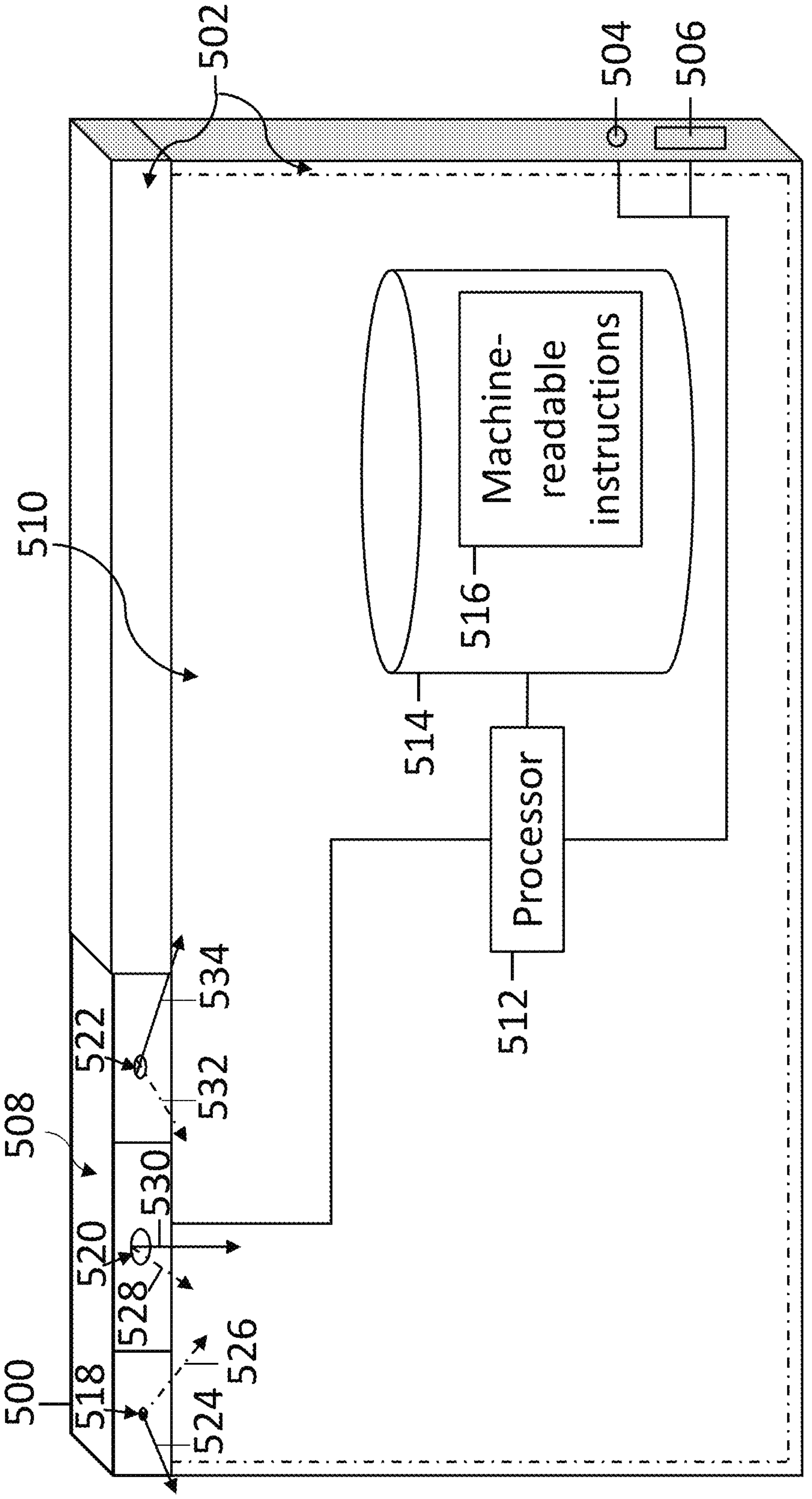
FIG. 5 is a block diagram depicting an electronic device including cavities having antennas, in accordance with various examples.

Referring now to FIG. 5, a block diagram showing an electronic device 500 including a cavity 508 having antenna is provided, in accordance with various examples. The electronic device 500 is a notebook, laptop, desktop, tablet, smartphone, or other suitable computing device that utilizes wireless communications. The electronic device 500 includes a frame 502. The frame 502 is a portion of a chassis of the electronic device 500. The frame 502 includes ports 504, 506 and cavity 508 and surrounds a display panel 510. The ports 504, 506 are input/output ports. A port 504 is an audio jack, for example. A port 506 is a Universal Serial Bus (USB) port, for example. The cavity 508 includes openings 518, 520, 522. The openings 518, 520, 522 emit light along light paths 526, 528, 532, respectively, from light sources within the cavity 508 and enable EM waves to propagate along EM paths 524, 530, 534, respectively from the cavity 508. The display panel 510 is a liquid crystal display (LCD) panel, an LED panel, a quantum dot (QD) panel, or any suitable display panel for displaying images.

The chassis houses a processor 512 and a storage device 514. The processor 512 is a microprocessor, a microcomputer, a microcontroller, a programmable integrated circuit, a programmable gate array, or other suitable device for managing operations of the electronic device 500 or a component or multiple components of the electronic device 500. For example, the processor 512 is a central processing unit (CPU), a graphics processing unit (GPU), or an embedded security controller (EpSC). The storage device 514 is a hard drive, a solid-state drive (SSD), flash memory, random access memory (RAM), or other suitable memory for storing data or machine-readable instructions of the electronic device 500.

While in some examples, the frame 502 is shown as separate from the display panel 510, in other examples, the frame 502 is integrated with a protective layer of the display panel 510. For example, the frame 502 is an integral portion of a glass layer that covers the display panel 510. While not explicitly shown, the electronic device 500 may include other components such as network interfaces, video adapters, sound cards, local buses, peripheral devices (e.g., a keyboard, a mouse, a touchpad, a speaker, a microphone, a display device), or a combination thereof. The other components are located within the chassis of the electronic device 500, for example.

In various examples, the processor 512 is coupled to the storage device 514, the ports 504, 506, and components (not explicitly shown) of the cavity 508. The storage device 514 stores machine-readable instructions 516, which, when executed by the processor 512, cause the processor 512 to control operations of the ports 504, 506, the components of the cavity 508, or a combination thereof.

As described above, the electronic device 500 includes the cavity 508. In some examples, the cavity 508 includes multiple cavities. The openings 518, 520, 522 are referred to as a first opening 518 of a first cavity (e.g., the cavity 100, 200, 300, 400) of the multiple cavities, a second opening 520 of a second cavity (e.g., the cavity 100, 200, 300, 400) of the multiple cavities, and a third opening 522 of a third cavity (e.g., the cavity 100, 200, 300, 400) of the multiple cavities, for example. In some examples, the first cavity has a first antenna (e.g., the antenna 108, 212, 308, 414). The first cavity includes a first light source and a first lens to direct a first light along a light path 526 generated by the first light source through the first opening 518. The first opening 518 has a dimension that is proportional to an operating frequency of the first antenna. The first opening 518 is for a laser aiming device, for example. The first antenna causes propagation of an EM wave along an EM path 524, for example. In other examples, the second cavity has a second antenna (e.g., the antenna 108, 212, 308, 414). The second cavity includes a second light source and a second lens to direct a second light along a light path 528 generated by the second light source through the second opening 520. The second opening 520 has a second dimension that is proportional to a second operating frequency of the second antenna. The second opening 520 is for an image sensor, for example. The second antenna causes propagation of an EM wave along an EM path 530, for example. In various examples, the third cavity has a third antenna (e.g., the antenna 108, 212, 308, 414). The third cavity includes a third light source and a third lens to direct a third light along a light path 532 generated by the third light source through the third opening 522. The third opening 522 has a third dimension that is proportional to a third operating frequency of the third antenna. The third opening 522 is for a LED, for example. The third antenna causes propagation of an EM wave along an EM path 534, for example.

In various examples, the cavity 508 includes a barcode scanner. The barcode scanner includes multiple cavities. The multiple cavities include different components and internal structures. The opening 518 is of a first cavity (e.g., the cavity 100, 200, 300, 400) that includes a laser aiming device that emits the light along the light path 526, for example. The opening 520 is of a second cavity (e.g., the cavity 100, 200, 300, 400) that includes an image sensor that emits the light along the light path 528, for example. The opening 522 is of a third cavity (e.g., the cavity 100, 200, 300, 400) that includes an LED that emits the light along the light path 532, for example. The multiple cavities are configured so that a first EM wave propagates in a first direction along the EM path 524, a second EM wave propagates in a second direction along the EM path 530, and a third EM wave propagates in a third direction along the EM path 534. In various examples, the first direction, the second direction, and the third direction are determined so that the first, the second, and the third EM waves do not interfere with each other. For example, the multiple cavities include different configurations of antenna locations, light source locations, guide structure locations, or a combination thereof, to generate the EM waves having the different directions.

By utilizing the cavity 508 of the barcode scanner located in the frame 502, an incoming EM wave is unimpeded by the display panel 510 that is conductive or by other components of the electronic device 500. By utilizing the cavity 508 of the barcode scanner located in the frame 502, an outgoing EM wave is unimpeded by the display panel 510 that is conductive or by other components of the electronic device 500. Utilizing the cavity 508 of the barcode scanner that includes guide structures to guide the EM waves, enables locating multiple antennas within the cavity 508 while reducing interference from other conductive components of the electronic device 500.

Locating the antennas within the cavity 508 allows for an increased STBR because the size of the frame 502 remains static while accommodating the antenna. Additionally, locating the antenna within the cavity 508 that includes the image sensor, the light sensor, the time of flight sensor, the barcode scanner, or other suitable peripheral device that includes a light source, a lens, an opening, or a combination thereof, enhances the performance of the antenna by reducing interference from other components. The reduced interference from the other components also reduces an amount of shielding utilized within the electronic device 500.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the term "comprising" is used in an open-ended fashion, and thus should be interpreted to mean "including, but not limited to . . . ." Also, the term "couple" or "is coupled" is intended to be broad enough to encompass both direct and indirect connections. Thus, if a first device is coupled to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:

a cavity having an antenna, the cavity including:

a light source; and a lens to direct a light generated by the light source through an opening, wherein the antenna is mounted to a planar surface of the lens within a central region of the cavity, wherein the opening is of any suitable shape having a dimension that has a proportional relationship to a wavelength of an operating frequency of the antenna, and wherein the dimension of the opening is a length, a width, a diameter, or a radius, the radius of the opening being a multiple of a wavelength of a resonant frequency of the antenna.

2. The electronic device of claim 1, wherein the cavity further includes a barcode scanner and guide structures to guide electromagnetic (EM) waves, and wherein, by utilizing the cavity of the barcode scanner, multiple antennas within the cavity are located while interference from other conductive components of the electronic device is reduced.

3. An electronic device, comprising:

a cavity having an opening, the cavity including:

a light source; and a lens having an antenna mounted on a planar surface of the lens within a central region of the cavity, the lens to direct a light generated by the light source through the opening, wherein a dimension of the opening is proportional to a wavelength of an operating frequency of the antenna, the dimension of the opening being a multiple of a wavelength of a resonant frequency of the antenna.

4. The electronic device of claim 3, wherein the cavity includes a laser aiming device, an image sensor, a light emitting diode (LED), or a combination thereof.

5. The electronic device of claim 3, wherein a length of the antenna is a multiple of a wavelength of a resonant frequency of the antenna.

6. The electronic device of claim 3, wherein a dimension of the opening is proportional to a wavelength of a resonant frequency of the antenna.

7. The electronic device of claim 3, wherein the planar surface of the lens has a first portion and a second portion, the first portion to direct the light generated by the light source and the second portion contiguous to the first portion, and wherein a metal trace of the antenna is mounted to the second portion.

* * * * *